United States Patent [19]

Stafford et al.

[11] Patent Number: 5,296,073
[45] Date of Patent: Mar. 22, 1994

[54] METHOD OF FORMING A WELDED JOINT BETWEEN POLYOLEFINIC MEMBERS

[75] Inventors: Trevor G. Stafford, Whitley Bay; Andrew Smart, Newcastle-upon-Tyne, both of United Kingdom

[73] Assignee: British Gas plc, London, England

[21] Appl. No.: 873,424

[22] Filed: Apr. 24, 1992

[30] Foreign Application Priority Data

Apr. 24, 1991 [GB] United Kingdom ............ 91 08934.2

[51] Int. Cl.⁵ .......................................... B29C 65/14
[52] U.S. Cl. ................................... 156/272.2; 156/86; 156/274.4; 156/293; 156/294; 156/296; 156/304.2; 156/309.6; 264/230; 285/156; 285/909
[58] Field of Search .............. 156/83, 86, 158, 274.4, 156/294, 296, 309.6, 293, 304.2, 272.2; 264/230; 285/156, 909

[56] References Cited

U.S. PATENT DOCUMENTS

| | | | |
|---|---|---|---|
| 3,847,183 | 11/1974 | Meyer | 264/230 |
| 3,861,972 | 1/1975 | Glover | 156/86 |
| 3,953,059 | 4/1976 | Carroll et al. | 285/DIG. 10 |
| 3,972,548 | 8/1976 | Roseen | 156/158 |
| 4,036,514 | 7/1977 | Hannover | 285/909 |
| 4,070,044 | 1/1978 | Carrou | 156/86 |
| 4,251,305 | 2/1981 | Becker et al. | 156/86 |
| 4,419,304 | 12/1988 | Ficke et al. | 264/230 |
| 4,521,041 | 6/1985 | Cox et al. | 285/909 |
| 4,636,272 | 1/1987 | Riggs | 156/86 |

FOREIGN PATENT DOCUMENTS

| | | | |
|---|---|---|---|
| 102919 | 3/1984 | European Pat. Off. | 156/86 |
| 0182604 | 5/1986 | European Pat. Off. | |
| 0251482 | 1/1988 | European Pat. Off. | |
| 3519439 | 12/1985 | Fed. Rep. of Germany | |
| 2006102 | 5/1979 | United Kingdom | |
| 2078602 | 1/1982 | United Kingdom | 156/86 |
| 2083406 | 3/1982 | United Kingdom | |
| 2214863 | 9/1989 | United Kingdom | |
| 2216459 | 10/1989 | United Kingdom | |

OTHER PUBLICATIONS

Patent Abstracts of Japan, "Molding body", vol. 14, No. 69, Feb. 8, 1990 (Kuraray Co. Ltd.).

Primary Examiner—Michael W. Ball
Assistant Examiner—Steven D. Maki
Attorney, Agent, or Firm—Larson and Taylor

[57] ABSTRACT

A polyethylene pipe 10 is joined by a welded joint to a cross-linked polyethylene coupler 14 which has been expanded to make the coupler heat recoverable. Radiant energy (eg light in the visible spectrum or infra-red light) illuminates the outer surface of the coupler 14 supplied by an array of 150W reflector lamps 20. The coupler 14 shrinks and is forced into engagement with the pipe 10 and the pipe 12 to join the pipes. A fusion welded joint is formed between the coupler 14 and each pipe, 10, 12. In an alternative a pipe is drawn down and inserted in an aperture through the wall of another pipe. A lamp is inserted in the drawn down pipe and the radiant energy causes the pipe to expand into engagement with the edge of the aperture and to be joined to it by a welded joint (FIG. 2).

6 Claims, 2 Drawing Sheets

METHOD OF FORMING A WELDED JOINT BETWEEN POLYOLEFINIC MEMBERS

The invention relates to methods of forming welded joints between polyolefinic members.

The invention is applicable to members made of polyethylene and other polyolefins, such as polypropylene and polybutylene for example.

The invention particularly relates to forming a welded joint between members where one of the members is made of cross-linked material.

It is a significant property of cross-linked material that, on reaching what would be the normal melting temperature range of, for example, polyethylene, it acquires a rubbery but still solid character. This occurs because the polyethylene crystalline structure breaks down but there remains a three dimensional polymer network due to the presence of molecular cross-links. One further consequence of this 'melting' behaviour of cross-linked polyethylene is that its optical properties change.

Unpigmented cross-linked polyethylene has a milky-white appearance caused by light scattering by the crystallite structures within the material. At a temperature of about 130° C. these crystallites collapse and the basic polymer structure enters the amorphous melt phase. In this condition the material is glass clear.

The observation of this change in optical character prompted the idea of using radiant energy as a means of welding the cross-linked polyethylene to non-cross-linked material. Such fusion welds essentially form when surfaces of the two materials are brought into contact at a temperature exceeding their crystalline melting temperatures. To form welds between cross-linked polyethylene undergoing deformation changes, such as shrink to fit couplings, it is necessary to heat through the entire volume of the material so that the bulk of the material exceeds the crystalline melting temperature range.

The need to heat through the entire wall of a cross-linked product requires considerable heat input which, by conventional electrical resistance wire, or hot iron techniques, is a slow process, because the material is a poor conductor. Furthermore, to drive heat energy through a wall by conduction requires a temperature gradient. For instance, to raise an inner wall temperature to 140° C. to effect a weld may require an external surface to be maintained at temperatures in excess of 250° C., where degradation can occur. The idea of using radiant energy to simultaneously cause through-heating and interface welding overcomes these problems. The cross-linked polyethylene absorbs the electromagnetic radiation at optical and infra-red frequencies until it melts and, as it goes clear, a greater amount of the radiation passes through. If the surface to which it is to be welded is itself pigmented, there will be increased energy absorption at the interface. The major thermal advantages of this concept are: the heat-through time is shorter, the external surface temperature rise is not excessive, and total energy absorbed is lower for a given welding temperature so that cooling requirements are reduced. A major practical advantage is that equipment to obtain the welding process can be made simple and rugged. Furthermore, the energy can be supplied as radiant energy in the immediate vicinity of the weld, regardless of the location of the site at which welding takes place.

U.S. Pat. No. 3,953,059 described a method of making a pipe connection of a first pipe high density polyethylene to the wall of a second pipe also made of high density polyethylene. A hole is formed through the wall of the second pipe and is of smaller diameter than the diameter of the first pipe. The connection end of the first pipe was flared outwardly first of all. Then, the same end was cold swaged using a swaging die, to reduce the diameter of the pipe end.

The reduced diameter end of the polyethylene pipe was then pushed through the hole in the second pipe. The cold-swaged end of the first pipe recovered, owing to its mechanical memory, towards the original diameter of the first pipe and so became a firm fit within the hole in the second pipe wall. Finally, sealant or adhesive is applied around the first pipe where it joins to the second pipe.

The two pipes in the method described in U.S. Pat. No. 3,953,059 were not joined by a fusion welded joint. The method is described as being suitable for connecting sewer pipes but it is clearly not suited for making welded joints suitable for use in gas or water pipe systems, for example.

According to the invention, in a method of forming a welded joint between a first member of polyolefinic material and a second member of cross-linked polyolefinic material, the members are arranged so that at least a part of an inner surface of one member encircles and is opposed to at least part of the outer surface of the other member, said second member being heat recoverable, and the surface of said second member remote from said opposed surfaces of the members is subjected to radiant energy so that at least in the region of said opposed parts of surfaces said second member recovers towards said first member and forces itself into engagement with the opposed surface of said first member and so that said opposed parts of surfaces reach a temperature at which a fusion bond occurs.

In one arrangement, said second member forms said one member and said second member is expanded to make it heat recoverable.

In another arrangement, said second member forms said other member and said second member is drawn down to make it heat recoverable.

Two embodiments of the invention will now be described by way of example with reference to the accompanying drawings, in which.

Figure 1:
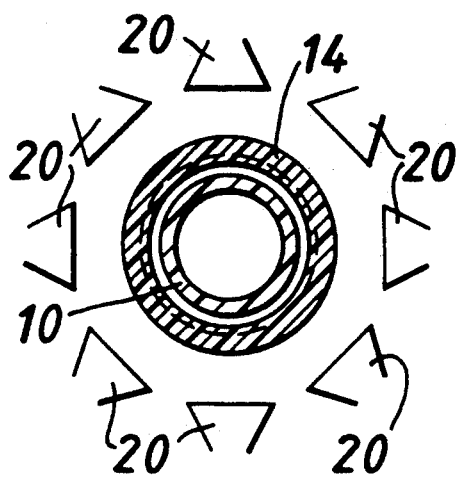
FIGS. 1 and 2 are, respectively, a transverse and a longitudinal section through pipes arranged end-to-end in a coupler in a position ready for joining to the coupler, the coupler being made of cross-linked material and forming said second member and each of said pipes forming said first member.
Figure 2:
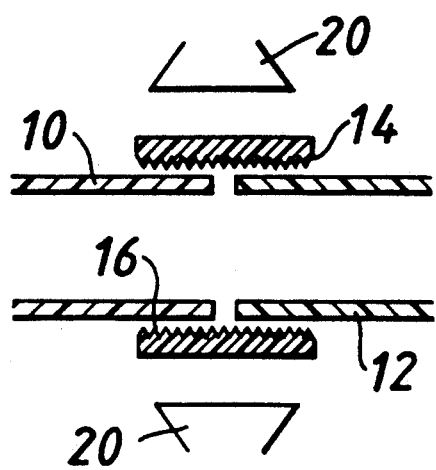
Figure 3:
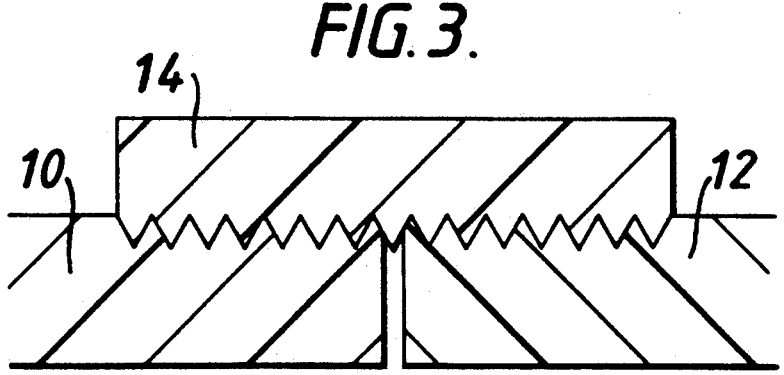
FIG. 3 is a longitudinal section through the completed joint between each pipe and the coupler shown in FIGS. 1 and 2.

In the first embodiment shown in FIGS. 1 to 3, two polyethylene pipes 10, 12 were arranged end-to-end with their end portions bridged by a hollow, cylindrical coupler 14 made of cross-linked polyethylene. The pipes 10, 12 each constituted a first member and the coupler 14 constituted a second member. The coupler 14 had a serrated inner surface and had been expanded to make it heat recoverable. The coupler 14 had an inside diameter which was slightly less than the 90 mm external diameter of the pipes 10, 12 and, after expansion, it had an internal diameter of about 92 mm. The external diameter of the coupler 14 was nominally 110 mm.

An array of eight 15OW lamps 20 was used to illuminate the outside surface of the coupler 14. The lamps 20 were arranged equiangularly separated as shown in FIG. 1. Thermocouples were used to monitor the temperatures at the outer surface of the coupler 14 and the outer surface of the tube 10. The coupler 14 became heated right through and after about ten minutes it became clear and shrank into contact with the pipes 10, 12. The temperature of the pipe 10 exceeded 140° C. and a fusion welded joint formed between the coupler 14 and each pipe 10, 12.

As shown in FIG. 3, the coupler 14 shrank sufficiently for the serrated inside surface to cut through the oxidised skin on the outer surface of the tubes 10, 12 and become joined by the welded joint to fresh material of the pipes 10, 12 underlying the surface skin. No preparation of the outside end surfaces of the pipes 10, 12 had been undertaken.

This arrangement is the basis of a method of joining two pipes 10, 12, each to a coupler 14, which is not limited by the initial air gap between the coupler 14 and the pipes 10, 12.

Figure 4:
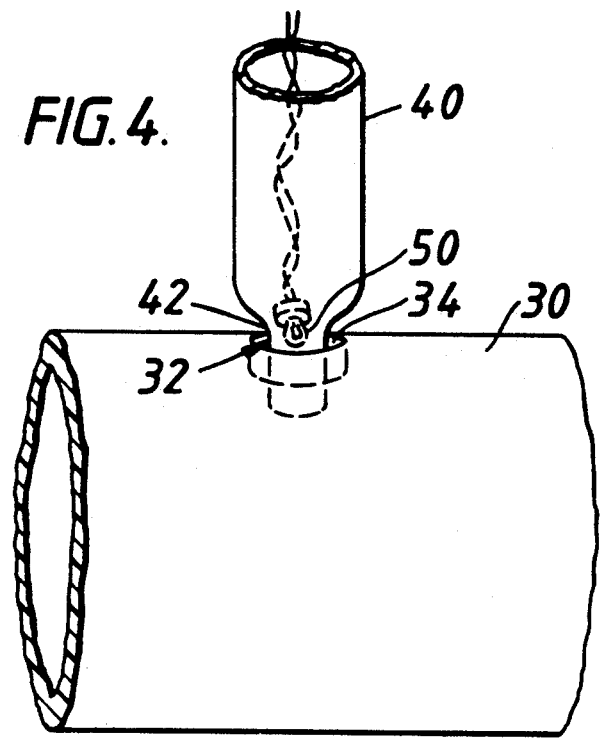
FIG. 4 is a three-dimensional view of a second embodiment showing the second member as a drawn down pipe extending into an aperture in the sidewall of a pipe forming the first member.
Figure 5:
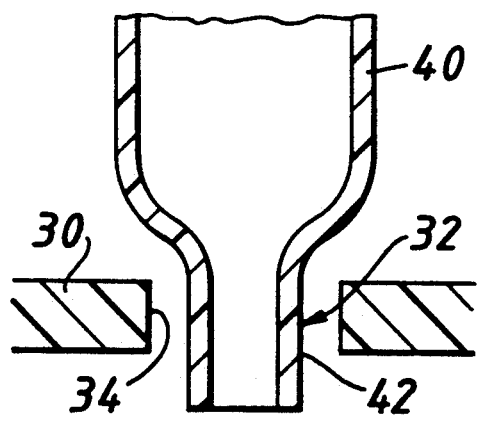
FIGS. 5 and 6 are scrap views of the drawn down pipe and part of the sidewall before and after the joint has been made, respectively.

In the second embodiment shown in FIG. 4 and 5 the first member was a polyethylene pipe 30 of 125 mm outside diameter. The pipe 30 had an aperture 32 cut through its sidewall and the aperture 32 was defined by the edge surface 34 of the aperture 32.

The second member was a 20 mm cross-linked pipe 40. The pipe 40 was drawn down by extension in a tensile testing machine to a portion 42 having an outside diameter of 10 mm. The diameter of the aperture 32 was less than the diameter of the pipe 40 and greater than the diameter of the portion 42.

The drawn down portion 42 was inserted in the aperture 32 and a 12V, 20W quartz-iodine projector lamp 50 was inserted in the tube 40. The inside surface of the pipe 40 was illuminated and eventually the pipe portion 42 expanded into contact with the edge 34. The lamp 50 could then be pushed into the portion 42.

Figure 6:
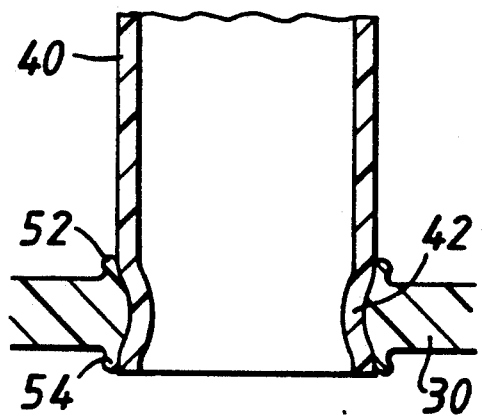

The portion 42 opposite the edge surface 34 was forced against that edge and a fusion welded joint was formed as shown in FIG. 6. When the portion 42 expanded it went from opaque to clear and the light from the bulb 50 was transmitted more efficiently through the polyolefinic material to the interface at the opposed surfaces of the portion 42 and the edge surface 34. The pipe 40 in the finished joint was almost the same diameter throughout. The first member, the pipe 30, was slightly upset at 52 and 54 which are annular "beads" surrounding the pipe 40 and 42. The outside diameter of the portion 42 is now larger than the diameter of original aperture 32.

The joint just described is useful in gas pipes where the pipe 30 is the main and the pipe 40 is a service pipe extending from the main to a consumer. The pipe 40 can be pushed through an existing cast iron service pipe (not shown) where it is desired to upgrade the service connection by the provision of a polyethylene new service pipe.

The bulb 50 can be pushed along the service pipe from the consumer end or can be pushed into the open end of the portion 42 within the pipe 30 by a machine especially designed to effect the welded joint from within the main.

When the joint has been made, the machine can be used to machine away the protruding end of the portion 42 within the main 30, as shown in FIG. 6.

The invention is applicable to larger pipes than those given in the above examples. For example, the main pipe may have a diameter of 1 mm or more and branch pipes of 125 mm, for example, can be jointed to the main pipe. In the case of the coupler, it is envisaged that couplers as large as 500 mm or more could be joined to pipes using the invention.

We claim:

1. A method of making a fusion welded joint comprising the steps of:
providing a hollow first member of non-crosslinked polyolefin material wherein said first member has a wall including a through-aperture defined by an edge surface having an original internal diameter;
providing a hollow second member of cross-linked polyolefin material having an end portion which has been drawn down so that said second member is heat recoverable, inserting said end portion of said second member in said through-aperture in said first member wherein, before heating, said end portion of said second member has an outside diameter which is less than said original internal diameter of said through-aperture;
inserting a source of electromagnetic radiation into said end portion of said second member; and
heating through said end portion with said source so that said end portion recovers outwardly into contact with said edge surface and so that polyolefin material of said fist member is upset at margins of said through-aperture, and while said end portion is recovering outwardly, said heating being of sufficient duration to ensure that a fusion welded joint is formed between said end portion of said second member and said first member.

2. A method according to claim 1, said wherein first member is a pipe, said second member is a pipe, and said edge surface is circular.

3. A method according to claim 1, wherein said second member comprises cross-linked polyethylene which appears opaque before heating and appears clear after said heating.

4. A method according to claim 3, wherein said first member is pigmented.

5. A method according to claim 1, in which said source is a source of light or infra-red radiation.

6. A method according to claim 1, in which said source is a bulb.

* * * * *